United States Patent
Payen

(10) Patent No.: US 7,000,527 B2
(45) Date of Patent: *Feb. 21, 2006

(54) APPLIANCE FOR COOKING FOOD, IN PARTICULAR A FRYER, INCLUDING A CATALYST AND MEANS FOR REGULATING THE CATALYST

(75) Inventor: Jean-Marc Payen, Quetigny (FR)

(73) Assignee: SEB S.E., Ecully (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/488,157

(22) PCT Filed: Aug. 30, 2002

(86) PCT No.: PCT/FR02/02966

§ 371 (c)(1),
(2), (4) Date: Aug. 13, 2004

(87) PCT Pub. No.: WO03/017813

PCT Pub. Date: Mar. 6, 2003

(65) Prior Publication Data

US 2004/0255791 A1    Dec. 23, 2004

(30) Foreign Application Priority Data

Aug. 31, 2001   (FR) .................................. 01 11471

(51) Int. Cl.
- *A23L 1/00* (2006.01)
- *A47J 27/00* (2006.01)
- *A47J 37/00* (2006.01)

(52) U.S. Cl. ............................ 99/330; 99/337; 99/403; 99/470; 55/467.1; 55/DIG. 36

(58) Field of Classification Search .................. 99/330, 99/331, 403–410, 444–450, 483, 337, 411–418, 99/485, 470; 219/492, 494, 497, 452, 506, 219/448, 401; 220/592, 314, 912, 316; 126/299 E, 126/389.1, 299 D, 299 R; 55/DIG. 36, 446, 55/467, 385.1, 467.1, 385.4; 312/31.1, 286
See application file for complete search history.

(56) References Cited

U.S. PATENT DOCUMENTS 2,815,427 A    12/1957    Schaefer ...................... 219/19
5,355,777 A *  10/1994    Chen et al. ................... 99/340

(Continued)

FOREIGN PATENT DOCUMENTS

FR    2 724 834    9/1995

Primary Examiner—Timothy F. Simone
(74) Attorney, Agent, or Firm—James W. Kayden; Thomas, Kayden, Horstemeyer & Risley, LLP

(57) ABSTRACT

An appliance for cooking food in a closed atmosphere, the appliance including a bowl (6) and a lid, heater means for heating the appliance, for the purpose of performing the cooking, and a catalytic converter (10) for treating the odors of the cooking fumes before the fumes are discharged to the outside, wherein the catalytic converter (10) includes at least one heater element, and the appliance further comprises temperature regulation means (12) for regulating the temperature of said heater elements, the temperature regulation means (12) being organized to sense the temperature of the cooking zone.

16 Claims, 2 Drawing Sheets

U.S. PATENT DOCUMENTS

| | | | |
|---|---|---|---|
| 5,580,535 A * | 12/1996 | Hoke et al. | 423/245.3 |
| 5,756,053 A | 5/1998 | Hoke et al. | 422/174 |
| 5,839,357 A * | 11/1998 | Ha et al. | 99/337 |
| 5,924,414 A * | 7/1999 | Schallig et al. | 126/389.1 |
| 6,283,015 B1 * | 9/2001 | Kwon et al. | 99/337 |
| 6,499,390 B1 * | 12/2002 | Huang | 99/331 |
| 6,807,899 B1 * | 10/2004 | Dirand | 99/403 |
| 6,823,772 B1 * | 11/2004 | Payen et al. | 99/330 |

* cited by examiner

APPLIANCE FOR COOKING FOOD, IN PARTICULAR A FRYER, INCLUDING A CATALYST AND MEANS FOR REGULATING THE CATALYST

TECHNICAL FIELD

The present disclosure relates to the general field of food-cooking appliances of the deep-fryer type equipped with means for treating cooking odors, which means include a catalytic subassembly through which cooking fumes or vapors pass before they are discharged to the outside of the appliance.

The present disclosure relates to an appliance for cooking food in a closed atmosphere, the appliance being of the deep fryer type for example, and including a bowl and a lid, heater means for heating the appliance, be they internal or external to the appliance, for performing cooking proper, and a catalytic converter for treating the odors from the cooking fumes or vapors before said cooking fumes are discharged to the outside of the appliance.

BACKGROUND

When cooking food, be it by steaming in rice cookers, for example, or by cooking in oil in deep-fryers, it is observed that cooking fumes are emitted to various extents depending on the type of cooking and on the cooking fluid used, such emitted fumes having a characteristic odor that is generally disliked by the user, and that it is desirable to prevent or to treat.

One of the first known treatment means naturally consists in cooking the food in a closed atmosphere by implementing a suitably leaktight connection between the bowl and the lid of the appliance.

However, for obvious safety reasons, in particular in pressure cookers or in deep fryers, it is always necessary to provide a leakage outlet for the cooking fumes, and that is why such appliances are equipped with means for treating cooking odors in order to rid the cooking fumes of all or some of the volatile molecules responsible for the cooking odor.

Various devices have been devised, and in particular it is known that activated carbon filters can be used that make it possible to retain all or some of the grease, as is described, for example, in Patent FR-1 568 985 or in Patent EP-150 516.

Unfortunately, in order to be effective, activated carbon filters in the cooking appliance must be changed frequently, which constitutes an additional design constraint for the appliance insofar as it is essential to make provision to design a system for fitting and removing the activated carbon filter. In addition, it is observed that the user frequently forgets to change the activated carbon filter, such an operation being perceived as a chore. The combination of all of those reasons makes the use of activated carbon filters ill-suited for treating cooking odors. In addition, they are not absolutely and universally effective and they also allow the stream of treated fumes discharged from the appliance to be seen.

A system for treating frying odors is also known that consists in condensing the cooking fumes in a condensation system mounted in the appliance. Such a system does not suffer from the drawbacks of having to change all or some of the system as is required for activated carbon filters, but it does require the user to perform a relatively tedious action each time a cooking operation is effected. The condensation system must be kept at a very low temperature, e.g. in a freezer, throughout the periods during which it is not in use, and it must then be fitted to the cooking appliance itself before any cooking operation. In addition, that system must then be emptied after the cooking operation. The requirement to make the system cold again prevents another cooking operation from being performed with the same system for 24 hours. This systematic fitting operation can be perceived by the user as an additional chore. Furthermore, condensation systems are generally large in volume, which constitutes a further design constraint insofar as it is necessary to integrate such a system into a cooking appliance whose size must generally be limited.

Finally it is already known that catalytic converters can be used for the purpose of treating cooking odors in particular when fitted to deep fryers. The use of catalytic converters avoids any specific action being necessary, unlike systems including activated carbon filters or condensation systems, because the catalytic converter is installed permanently in the appliance, and thus forms a permanent odor treatment unit.

Unfortunately, the use of a catalytic converter in a food-cooking appliance, and in particular in a deep fryer, is difficult to implement insofar as the temperatures reached can be high and can be dangerous for the structural integrity of the appliance and for the user. In addition, in order to obtain good treatment of the cooking odors, and in order to make the treated and discharged cooking fumes invisible, it is necessary to reach temperatures that are sufficiently high. At the same time, it is not possible, for safety reasons, to prefer operating a catalytic converter at temperatures that are too low because the efficiency of the catalytic converter is then too low, and it is then observed that residual cooking odors remain.

It can thus be understood that integrating catalytic converters into food-cooking appliances, and in particular into deep fryers, is an operation that is difficult to implement, and that it is desirable to design food-cooking appliances that are provided with catalytic converters but that are nevertheless capable of operating under good conditions.

SUMMARY

An object of the present disclosure is thus to remedy the various above-mentioned drawbacks of the prior art, and to provide a novel appliance for cooking food in a closed atmosphere, which appliance is equipped with a catalytic converter for treating the cooking odors, and is capable of operating well by using means that are simple, safe, and effective.

Another object of the disclosure is to provide a novel cooking appliance in which operation of the catalytic converter is regulated by means that are simple and reliable.

Another object of the disclosure is to provide a novel cooking appliance whose manufacturing cost is particularly low.

Another object of the disclosure is to provide a novel cooking appliance in which the efficiency of the catalytic converter is particularly high and obtained by means that are simple are inexpensive.

Another object of the disclosure is to provide a novel food-cooking appliance in which the efficiency of the catalytic converter is particularly high, and in which discharge of the fumes is invisible.

An additional object of the disclosure is to provide a novel cooking appliance whose operating safety is reinforced.

The objects assigned to the disclosure are achieved by means of an appliance for cooking food in a closed atmosphere, the appliance including a bowl and a lid, internal or external heater means for heating the appliance, for the purpose of performing the cooking, and a catalytic converter for treating the odors of the cooking fumes before the fumes are discharged to the outside, wherein:

the catalytic converter includes at least one heater element; and the appliance further includes temperature regulation means for regulating the temperature of the heater elements, the means being organized to sense the temperature of the cooking zone.

BRIEF DESCRIPTION OF THE DRAWINGS

Other objects and advantages of the present disclosure will appear in more detail on reading the following description with reference to the accompanying drawings which are given by way of non-limiting and illustrative example, and in which.

DETAILED DESCRIPTION

Figure 1:
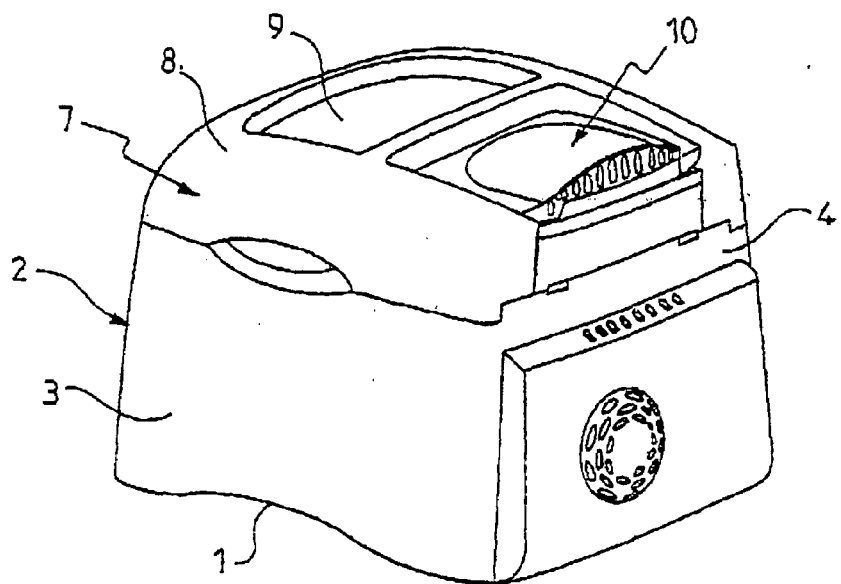
FIG. 1 is an overall perspective view of a food-cooking appliance of the disclosure (a deep fryer in this example)
Figure 2:
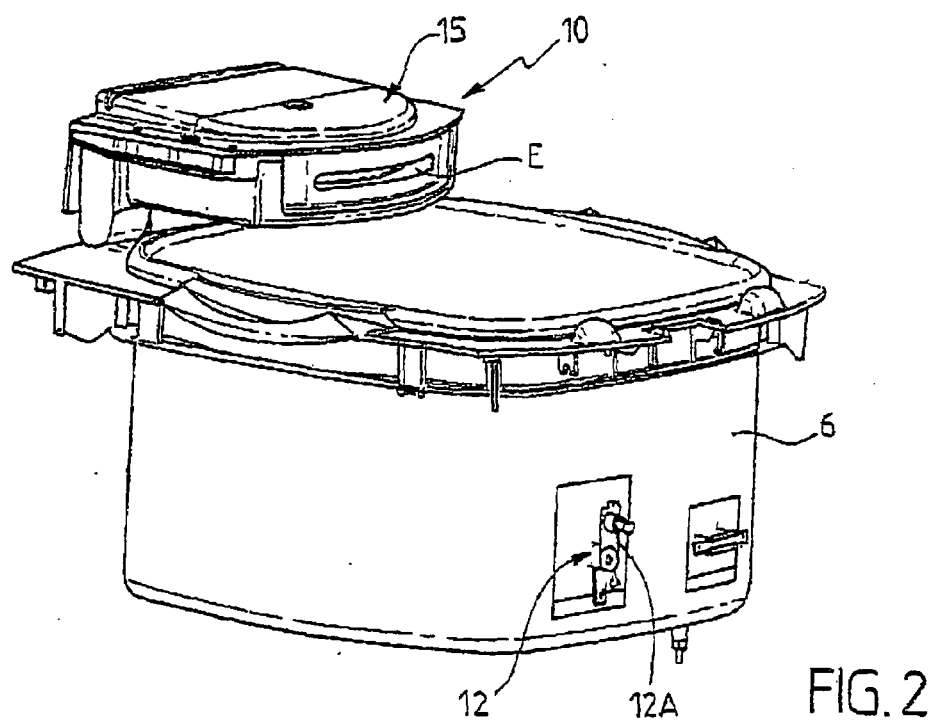
FIG. 2 is a fragmentary perspective view showing a detail of an embodiment of the inner portion of a deep fryer of the disclosure.
Figure 3:
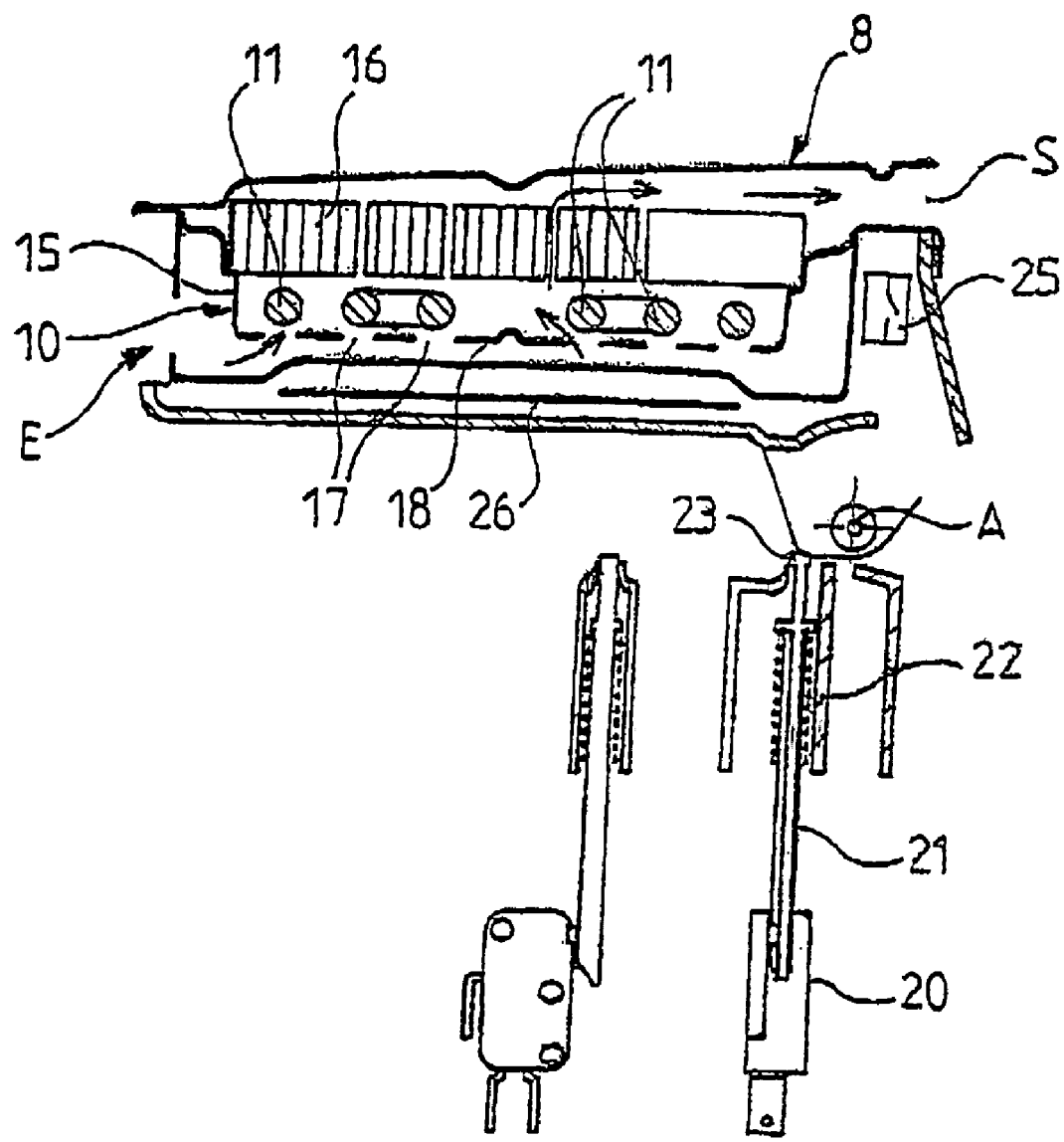
FIG. 3 is a fragmentary section view on a transverse plane, showing a detail of an embodiment of a catalytic converter of the disclosure, as fitted in the removable lid of a deep fryer.

In the embodiments shown in FIGS. 1 to 3, the food-cooking appliance that is described is constituted by a deep fryer serving for and designed for deep frying all kinds of food in fat, such as a bath of oil, for example. For the purposes of the disclosure, the term "food-cooking appliance" should nevertheless be extended to cover all domestic food-cooking appliances that are suitable for cooking food, application to frying appliances of the deep fryer type being merely a preferred application, it naturally being possible for application to other uses such as to rice cookers or to multi-purpose cookers, provided that such cooking appliances implement cooking in a cooking fluid contained in a closed enclosure that is substantially leaktight.

The food-cooking appliance shown in FIGS. 1 to 3, which is an electric deep fryer in this example, includes a base 1 serving to form the stand for the appliance and designed to rest on a support surface or worktop. The base 1 is generally integral with an outer skirt 2 or else it is separate and secured thereto, the skirt being made, for example, of a metal or of a heat-resistant plastic forming the outer casing of the deep fryer. However, the outer skirt 2 is conventionally made of a plastic that is cheap and not very heat-resistant such as polypropylene, and that cannot withstand the heat energy dissipated continuously by the high-temperature heater elements conventionally used in electric deep fryers, and generally disposed at the bottom in the vicinity of the base 1.

The heater means of the appliance (not shown in the figures) may be internal to the appliance and conventionally composed of metal-clad elements or equivalent elements, connected, also conventionally, to an electrical connection unit (not shown) and to electrical cabling making it possible to connect the appliance to the mains. Also in a manner known to the person skilled in the art, the cooking appliance of the disclosure is provided with a set of electrical or electronic safety means such as temperature sensors, fuses, etc. required when designing such appliances. Since these elements are well known to the person skilled in the art, they are not described in any more detail in the remainder of the description. The heater means may also be external to the appliance and separate or separable therefrom.

The outer skirt 2 may be of any suitable and attractive shape, e.g. circular, oval, or rectangular, so as to define, for example, side faces 3 and front and back faces 4.

The top portion of the outer skirt 2 is advantageously provided with an annular ring for mechanically coupling the top portion of the outer skirt 2 to a cooking bowl 6 which is generally made of metal and which serves to receive the frying oil and the food to be fried. Advantageously, and as is well known to the person skilled in the art, and as described, for example, in Patent FR-87 06728, the annular ring is advantageously made of a thermally insulating material that continuously withstands the operating temperatures of the deep fryer, e.g. polyamide, polyester, polybutylene terephthalate (PBTP) or the like, and said ring supports the cooking bowl 6, at least in part.

Preferably, the base 1, the outer skirt 2, and the annular ring together form the main body of the food-cooking appliance of the invention.

In the preferred embodiment, the deep fryer has a removably mounted lid 7 hinged relative to the main body of the deep fryer and serving, during the cooking, to close said main body in substantially leaktight manner, e.g. by means of sealing gaskets (not shown in the figures).

Advantageously, and as shown in FIGS. 1 and 2 in particular, the lid 7 may be provided on its top face 8 with an inspection window 9 making it possible to monitor the progress of the cooking or of the frying throughout the cooking cycle, and while the lid is closed on the main body.

Cooking food in a closed environment in a cooking fluid, be it by steaming or by frying, generates characteristic and often unpleasant odors resulting from chemical reactions related to the cooking proper, and in particular to the emission of volatile organic compounds.

The appliance for cooking food in a closed atmosphere thus includes a bowl 6, a lid 8, and heater means that are internal or external and that serve to perform the cooking. It further includes a system for applying heat treatment to the cooking odors, namely a catalytic converter 10 for treating the odors from the fumes before they are discharged to the outside of the appliance.

Preferably, and as illustrated, for example, in FIG. 3, the catalytic subassembly 10 includes at least one heater element 11, the appliance further including regulation means 12 for regulating the temperature of the heater elements 11, the regulation means 12 being organized to sense the temperature of the cooking zone.

By means of this configuration, it is thus possible to regulate the temperature of the heater elements 11 of the catalytic converter 10 via a thermal image that is not situated in the catalytic converter itself but rather that corresponds to an image representative of the temperature prevailing in the cooking fluid.

The temperature regulation means 12 include a temperature sensor 12A mounted in a manner such as to sense the temperature of the cooking bowl 6 as an image of the cooking temperature.

Advantageously, and as shown in FIG. 2, the temperature sensor 12A is mounted against or on the outer wall of the bowl 6. The temperature sensor 12A may also be mounted against or on the inside wall of the bowl 6, and then be in the cooking bath itself. It is thus against or on the side wall of the bowl 6.

In a manner well known to the person skilled in the art, the temperature sensor 12A may be a thermostat (FIG. 2), a bimetallic strip, or any other equivalent means such as a bulb or a shape memory alloy (SMA), for example.

Advantageously, and as shown in FIG. 2, the temperature sensor 12A is mounted on the bowl 6 at a height corresponding to the height of the bath of oil and, for example, half way to the maximum permitted height for the bath of oil. By way of a variant, the temperature sensor 12A may also be mounted against or on the bottom of the bowl 6.

As is well known to the person skilled in the art, the appliance further includes a temperature regulation system (not shown) for regulating the temperature of the heater means, and, for example, including a thermostat, the system serving for regulating the temperature of the appliance and of the oil bath as a function of the reference temperature set by the user.

In a particularly advantageous embodiment, the temperature regulation system for regulating the temperature of the appliance heater means is associated with the temperature regulation means 12 for regulating the temperature of the catalytic converter 10, the regulation system including a temperature sensor common to the temperature regulation means 12. In this variant, the temperature sensor 12A serving for regulating the temperature of the heater elements 11 of the catalytic converter, thus also serves for regulating the temperature of the heater means of the deep fryer. The temperature of the catalytic converter 10 is thus regulated by a single common element of the deep fryer, namely the thermostat (or an equivalent member). The corresponding electrical connection thus implies that the resistor elements of the deep fryer and of the heater elements 11 are connected in parallel.

By way of a variant, it is naturally possible to implement a configuration in which the system for regulating the temperature of the deep fryer heater means is separate from the temperature regulation means 12 for regulating the temperature of the catalytic converter 10, the system and the means including respective temperature sensors. In this variant, since the reference temperatures are different for each of the thermostats, the effectiveness of the catalytic converter can be increased.

In a particularly advantageous embodiment, the catalytic converter 10 is formed by a housing 15 which is mounted and integrated in the lid 8 of the appliance.

The housing 15 contains a catalytic unit 16 forming the top portion of the housing 15, and extending in the vicinity of the outside face of the cover 8. The housing 15 also contains the heater elements 11 which extend in the vicinity of and under the catalytic unit 16 for the purpose of heating it by radiation, without hot spots appearing. The housing 15 is provided with admission orifices 17 for admitting the cooking fumes to be treated, the orifices 17 being, for example, provided through a stainless steel bottom plate 18 of the housing 15 that is situated substantially in register with the cooking bowl, the heater elements 11 being interposed between the orifices 17 and the catalytic unit 16, and being disposed substantially in register with said orifices 17.

By means of this configuration, the cooking fumes to be treated are heated in uniform and efficient manner, thereby guaranteeing that the catalytic converter operates properly and with good effectiveness.

Advantageously, the heater elements 11 are formed by a resistor in the form of a sinuous or helical coil, for example.

In addition, it is particularly advantageous for the sinuous or helical resistor to extend over the entire surface of the catalytic unit 16 so as to obtain, by means of the sinuous configuration, a higher concentration of the electrical resistor 11 at the periphery of the catalytic unit 16. This configuration considerably reduces the occurrence of hot spots in the catalytic unit, in particular in the vicinity of its central portion which is free of change-of-direction zones corresponding to the zig-zag of sinuous coils.

Preferably, the heater elements 11 have a maximum heat load of not more than 3 watts per square centimeter ($W/cm^2$), and preferably less than or equal to 2.5 $W/cm^2$. This makes it possible to obtain a maximum temperature of about 600° C. during treatment, which avoids overheating and which makes it possible to maintain uniformity in treating the fumes.

As shown in particular in FIG. 3, the housing 15 is advantageously mounted in the lid 8 of the appliance, which lid is mounted on a hinge A so that it can pivot between a closed position (FIG. 3) and an open position (not shown) in which the lid 8 is substantially vertical.

According to an advantageous feature the heater elements 11 are connected to an electrical circuit including a switch 20, such as a micro-switch associated with the position of the lid 8, so that the switch 20 interrupts the electrical power supply to the heater elements 11 as soon as the lid is opened or removed.

As shown in FIG. 3, the switch 20 is actuated by a rod 21 mounted to slide resiliently, longitudinally, and freely in a sleeve 22, so that, in the rest position, the end 23 of the rod 21 comes flush with the outside of said sleeve 22. In this free rest position, corresponding to the lid 8 being in the open position, the switch 20 opens the electrical circuit of the heater elements 1. In contrast, while the lid 8 is being closed, the end 23 of the rod 21 is engaged by the lid when it reaches its substantially leaktight closure position, so that the electrical circuit of the heater elements 11 is closed. This configuration guarantees good operating safety by ensuring that the catalytic converter is switched off automatically whenever the lid is opened. This configuration also ensures the catalytic converter does not operate whenever the user seeks to cook while taking action in the oil. When the lid is removed, since the springs urge the catalytic assembly into the vertical position, the catalytic converter does not operate, thereby avoiding any risk of burns.

The operating safety of the appliance may be increased by fitting a safety thermostat 25 in the appliance, in the vicinity of the catalytic converter 10. Thus, the appliance may have an ambient temperature and safety thermostat 25 connected to the electrical power supply circuit of the heater elements 11, the thermostat 25 being disposed in the vicinity of the catalytic converter 10, e.g. in a chamber that may be open or closed, and that is adjacent to the catalytic converter 10, for the purpose of detecting the ambient temperature around the catalytic converter 10 and of interrupting the electrical power supply to the heater elements 11 in the event that the reference temperature is exceeded.

The ambient temperature thermostat 25 is particularly useful for avoiding problems of overheating of the plastics parts in the event that ventilation is temporarily insufficient, the thermostat 25 then automatically switching off the heater elements 11. During such a temporary interruption, the cooking fumes can exit without being treated, with the catalytic converter resuming normal operation as soon as the temperature detected by the safety thermostat 25 is lower than the reference temperature.

Advantageously, a backing plate 26 may be integrated under the housing 15 and at some distance therefrom for providing a thermal brake and for protecting the plastics structure of the lid 8 in the event of temporary overheating.

Conventionally, the catalytic unit 16 may be made of a material of the cordierite, ceramic, or zirconia-mullite type, with standard calibrated holes of 100 cells per square inch (CPSI) or 400 CPSI, or it may be made of a material of the 20 pounds per inch (PPI) foam type in supports, such as those sold by SICAT, for example.

The surface area of the catalytic unit 16 is computed so as to avoid head loss and so as to obtain an acceptable transit speed for the fumes. By way of example, the basic surface area of the catalytic unit 16 may be 4000 square millimeters ($mm^2$) for a height of at least about 30 millimeters (mm), with calibrated holes of 200 CPSI or 400 CPSI. In another variant embodiment, the catalytic unit may have a basic surface area of about 8000 $mm^2$ with a reduced height of 12 mm for calibrated holes of 200 CPSI or 400 CPSI.

During cooking, the cooking fumes are directed towards the inlet E of the catalytic converter 10 so as to penetrate into the orifices 17 after being distributed along an inlet channel situated under and along said admission orifices 17.

The cooking fumes are then preheated or heated by flowing over the heater elements 11, they are then treated by catalysis by flowing through the catalytic unit or catalytic converter 16, and they are then discharged to the outside of the deep fryer, preferably backwards via the outlet S.

In addition to the odors being treated as they flow through the hot portions of the catalytic converter, the oil vapors contained in the fumes undergo pyrolysis which guarantees that the cooking fumes at the outlet of the catalytic converter are treated in full.

The regulating system of the disclosure therefore makes it possible to treat the cooking fumes and vapors particularly effectively by using a catalytic converter, while also implementing particularly simple and effective temperature regulation means, and while complying with good safety conditions. The treated fumes as discharged are also invisible.

SUSCEPTIBILITY OF INDUSTRIAL APPLICATION

An industrial application of the disclosure lies in designing and manufacturing food-cooking appliances, and in particular deep fryers.

What is claimed is:

1. An appliance for cooking food in a closed atmosphere, the appliance comprising a bowl (6) and a lid (8), heater means for heating the appliance, for the purpose of performing the cooking, and a catalytic converter (10) for treating the odors of the cooking fumes before the fumes are discharged to the outside, wherein:
    the catalytic converter (10) includes at least one heater element (11); and
    the appliance further comprises temperature regulation means (12) for regulating the temperature of said heater elements (11), said temperature regulating means (12) being organized to sense the temperature of the cooking zone.

2. The appliance according to claim 1, wherein the regulation means (12) further comprise a temperature sensor (12A) mounted in a manner such as to sense the temperature of the cooking bowl (6) as an image of the cooking temperature.

3. The appliance according to claim 2, wherein the temperature sensor (12A) is mounted against or on the outside wall of the bowl (6).

4. The appliance according to claim 1, further comprising a temperature regulation system for regulating the temperature of the heater means.

5. The appliance according to claim 4, wherein the system for regulating the temperature of the heater means is associated with the means (12) for regulating the temperature of the catalytic converter (10), said system for regulating the temperature of the heater means including a temperature sensor that is common to said temperature regulation means.

6. The appliance according to claim 4, wherein the system for regulating the temperature of the heater means is separate from the means (12) for regulating the temperature of the catalytic converter, said system for regulating the temperature of the heater means and said means for regulating the temperature of the catalytic converter having respective temperature sensors.

7. The appliance according to claim 6, wherein the sensor for sensing the temperature of the bowl is a thermostat.

8. The appliance according to claim 7, wherein the thermostat is placed against one of the group consisting of on the bottom of the bowl, and against and on the side wall of the bowl.

9. The cooking appliance according to claim 1 wherein the heater elements of the catalytic converter have a maximum heat load of not more than 3 $W/cm^2$, and preferably less than or equal to 2.5 $W/cm^2$.

10. The appliance according to claim 9, wherein the catalytic converter is formed by a housing (15) containing a catalytic unit (16) and heater elements (11), said housing (15) being provided with admission orifices for admitting the cooking fumes to be treated, the heater elements (11) being interposed between the orifices (17) and the catalytic unit (16), and disposed substantially in register with said orifices (17).

11. The appliance according to claim 10, wherein the heater elements (11) are formed by a resistor in a sinuous configuration.

12. The appliance according to claim 11, wherein the sinuous resistor (11) extends over substantially the entire surface of the catalytic unit (16).

13. The appliance according to claim 12, wherein the housing (15) is mounted in the lid (8) of the appliance.

14. The appliance according to claim 1 wherein the heater elements (11) are connected to an electrical circuit including a switch (20), such as a micro-switch, associated with the position of the lid (8) so that the switch (20) interrupts the electrical power to the heater elements (11) whenever the lid (8) is opened or removed.

15. The appliance according to claim 1 further comprising a safety thermostat (25) connected to an electrical power supply circuit of the heater elements(11), said thermostat being disposed in the vicinity of the catalytic converter for detecting the ambient temperature and for interrupting the electrical power supply to the heater elements (11) in the event that the reference temperature is exceeded.

16. The appliance according to claim 1 wherein the appliance further comprises a deep fryer.

* * * * *